United States Patent
Liu et al.

(10) Patent No.: US 7,787,398 B2
(45) Date of Patent: Aug. 31, 2010

(54) MINIMIZING MUTUAL INTERFERENCE FOR MULTI-RADIO CO-EXISTENCE PLATFORMS

(75) Inventors: Changwen Liu, Portland, OR (US); Xue Yang, Portland, OR (US); Xingang Guo, Portland, OR (US); Chul Kim, Seoul (KR)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 11/904,362

(22) Filed: Sep. 27, 2007

(65) Prior Publication Data

US 2009/0086712 A1 Apr. 2, 2009

(51) Int. Cl.
*H04L 12/28* (2006.01)
(52) U.S. Cl. .................. 370/254; 370/328; 455/446
(58) Field of Classification Search ................. None
See application file for complete search history.

(56) References Cited

U.S. PATENT DOCUMENTS

| | | | |
|---|---|---|---|
| 7,725,118 B2 * | 5/2010 | Yang et al. | 455/502 |
| 2007/0135162 A1 * | 6/2007 | Banerjea et al. | 455/556.1 |
| 2007/0232358 A1 * | 10/2007 | Sherman | 455/560 |
| 2007/0275746 A1 * | 11/2007 | Bitran | 455/509 |
| 2008/0247367 A1 * | 10/2008 | Guo et al. | 370/338 |
| 2008/0247445 A1 * | 10/2008 | Guo et al. | 375/220 |
| 2009/0017756 A1 * | 1/2009 | Tsfaty et al. | 455/41.2 |
| 2009/0054009 A1 * | 2/2009 | Yang et al. | 455/78 |

* cited by examiner

*Primary Examiner*—Bob A Phunkulh
(74) *Attorney, Agent, or Firm*—Ryder, Lu, Mazzeo and Konieczny, LLC; Douglas J. Ryder

(57) ABSTRACT

In general, in one aspect, the disclosure describes a method that includes selecting an offset between start of communications of a first radio in a multi-radio platform (MRP) and start of communications of a second radio in the MRP. Synchronizing clocks of the first radio and the second radio to maintain the offset. Determining safe zones within the communications of the second radio based on configuration of the first radio and the second radio and the selected offset. The safe zones are locations that minimize conflicts between receiving operations of the first radio that are at fixed locations and transmitting operations of the second radio and transmitting operations of the first radio that are at fixed locations and receiving operations of the second radio.

12 Claims, 5 Drawing Sheets

| T_OFFSET | BT SCO HV1 LINK | BT SCO HV2 LINK | BT SCO HV3 LINK |
|---|---|---|---|
| 0 | 100% | 100% | 33.3% |
| 1 | 0% | 0% | 0% |
| 2 | 100% | 0% | 33.3% |
| 3 | 0% | 0% | 0% |
| 4 | 100% | 100% | 33.3% |
| 5 | 0% | 0% | 0% |

*FIG. 4*

| DL:UL RATIO | BT SCO HV1 RX | BT SCO HV2 RX | BT SCO HV3 RX |
|---|---|---|---|
| 1:1 | 25% TOTAL 12.5% WiMAX DATA TX 6.25% CONTENTION CODE 6.25% BW REQ TX | 37.5% TOTAL 12.5% WiMAX DATA TX 12.5% CONTENTION CODE 12.5% BW REQ TX | 25% TOTAL 12.5% WiMAX DATA TX 6.25% CONTENTION CODE 6.25% BW REQ TX |
| 5:3 | 6.25% TOTAL 6.25% WiMAX DATA TX | 0% | 6.25% TOTAL 6.25% WiMAX DATA TX |
| 6:2 | 18.75% TOTAL 6.25% WiMAX DATA TX 6.25% CONTENTION CODE 6.25% BW REQ TX | 0% | 18.75% TOTAL 6.25% WiMAX DATA TX 6.25% CONTENTION CODE 6.25% BW REQ TX |
| 7:1 | 0% | 0% | 0% |

*FIG. 5*

MINIMIZING MUTUAL INTERFERENCE FOR MULTI-RADIO CO-EXISTENCE PLATFORMS

BACKGROUND

The desire for wireless communications continues to increase and accordingly the number and type of wireless networks (e.g., wireless local area network (WLAN), wireless metropolitan area networks (WMAN), wireless personal area networks (WPAN)) available for wireless communications continues to increase. In order for mobile devices (e.g., laptop computers, handheld devices) to provide wireless communications there is a need for the devices to accommodate several different wireless network types (network models). In order to support multiple wireless networks, the mobile devices may include a cluster of different radios for communicating over the various network types (referred to as the Multi-Radio coexistence Platforms (MRP)).

The various radios may operate in overlapping or adjacent frequency bands and possibly suffer from interference when they operate at overlapping time instants due to, for example, physical proximity and radio power leakage. When the transmission of data for a first network model (e.g., WPAN) overlaps with the reception of data on a second network model (e.g., WMAN) in time domain the WMAN reception can suffer due to the interference from the WPAN transmission. Likewise, WMAN transmissions can interfere with WPAN reception when they overlap in the time domain. Solutions in the radio frequency (RF) domain might be possible to partially mitigate the mutual interference between network models but may increase the hardware cost of the MRP.

BRIEF DESCRIPTION OF THE DRAWINGS

The features and advantages of the various embodiments will become apparent from the following detailed description in which:

FIG. 4 illustrates a table of example results for MRP WiMAX receive temporal overlapping ratio due to BT transmissions for various offset values and BT SCO links, according to one embodiment;

FIG. 5 illustrates a table of example results for MRP BT receive temporal overlapping ratio due to WiMAX transmissions for various DL:UL rations and BT SCO links, according to one embodiment.

DETAILED DESCRIPTION

A Multi-Radio coexistence Platforms (MRP) mobile device, such as a cellular phone, may include a wireless personal area network (WPAN) radio and a wireless metropolitan area network (WMAN) radio. The MRP may relay voice traffic between its WPAN and WMAN radios. The WPAN radio may communicate voice data between the device and a WPAN headset via a synchronous connect oriented (SCO) link while the WMAN radio may be communicate voice data via a voice over internet protocol (VoIP) session with a WMAN base station. Time domain overlapping of the transmission of WPAN voice data with the reception of WMAN voice data can cause interference therebetween and degrade the WMAN reception. Likewise, WMAN transmissions can interfere with WPAN reception when they overlap in the time domain.

The WMAN network may be compliant with the IEEE standard 802.16.x (WiMAX) and the WPAN network may be compliant with the Bluetooth core specification version 2.0 with enhanced data rate (Bluetooth).

Scheduling the transmission and reception of the different radios to not overlap in the time domain can substantially reduce the interference and accordingly increase the performance of the MRP. Scheduling may include use of an offset between the start of communications for the various radios and safe zones for transmitting and receiving data for the various radios.

Figure 1:
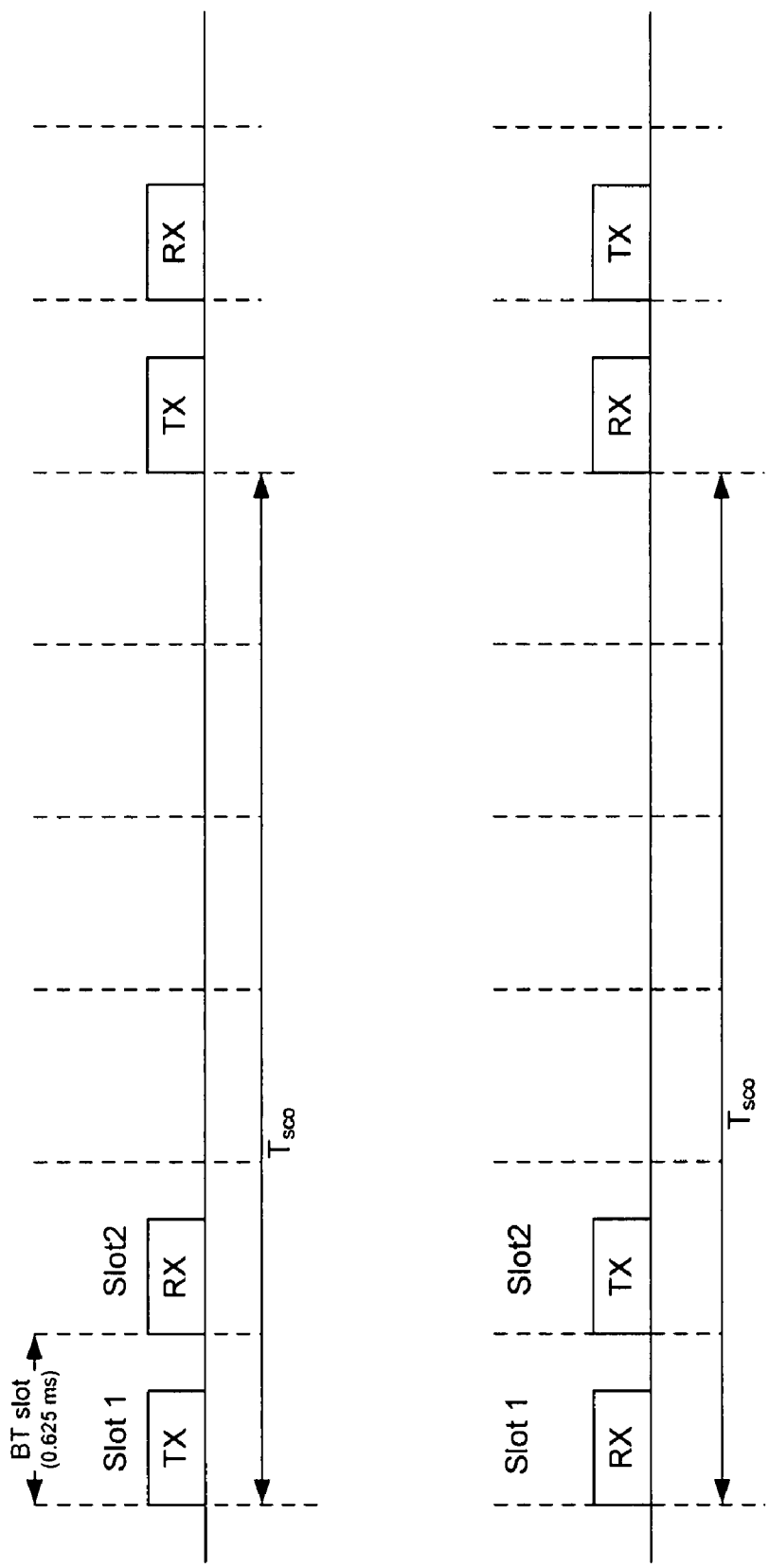
FIG. 1 illustrates example operational sequence of a Bluetooth (BT) high quality voice (HV3) SCO link, according to one embodiment.

FIG. 1 illustrates example operational sequence of a Bluetooth (BT) high quality voice (HV3) SCO link. Data is transmitted and received in slots and each slot has a constant 0.625 ms duration ($T_{BT\text{-}SLOT}$) and the SCO link has an interval ($T_{SCO}$) equal to 6 slots. The master-to-slave (MRP to headset) operational sequence includes transmissions in the first slot and reception in the second slot of each $T_{sco}$ and slave-to-master (headset to MRP) operational sequence directly follows so that the first slot is for reception and the second slot is for transmission. The MRP BT master transmitting slots can be calculated as $1+T_{SCO}m$ (equation 1), and the MRP BT master receiving slots can be calculated as $2+T_{SCO}m$ (equation 2), where m is an integer $\geq 0$.

As BT communications have a defined characteristics for the SCO link (e.g., number of slots, slot duration, location of transmit and receive slots), it can be used as the basis for determining offsets and safe zones for other radio communications where transmit and receive locations can be defined.

Figure 2:
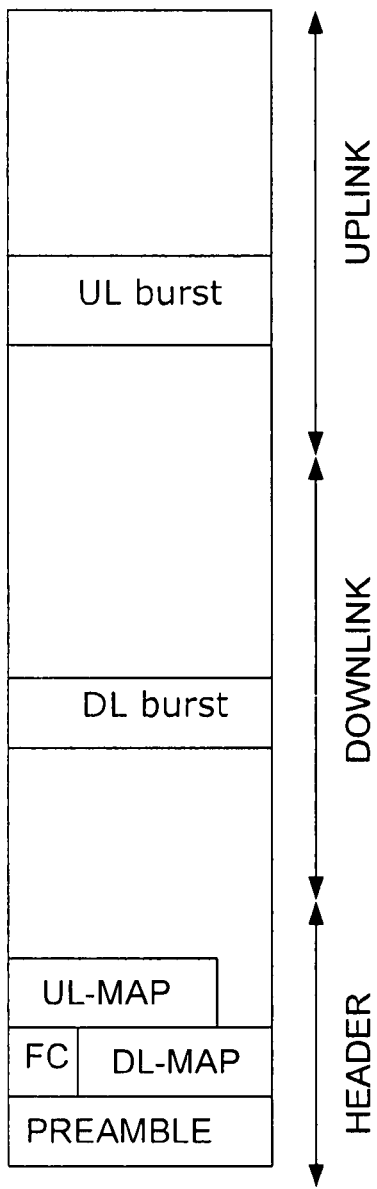
FIG. 2 illustrates an example WiMAX frame structure, according to one embodiment.

FIG. 2 illustrates an example WiMAX frame structure that includes a header, a downlink portion and an uplink portion. The header includes a preamble, frame control (FC), downlink map (DL-MAP) and uplink map (UL-MAP). The DL-MAP and UL-MAP define the portions of the frame utilized for receiving data from base station (DL bursts) and transmitting data to the base station (UL burst) respectively.

Figure 3:
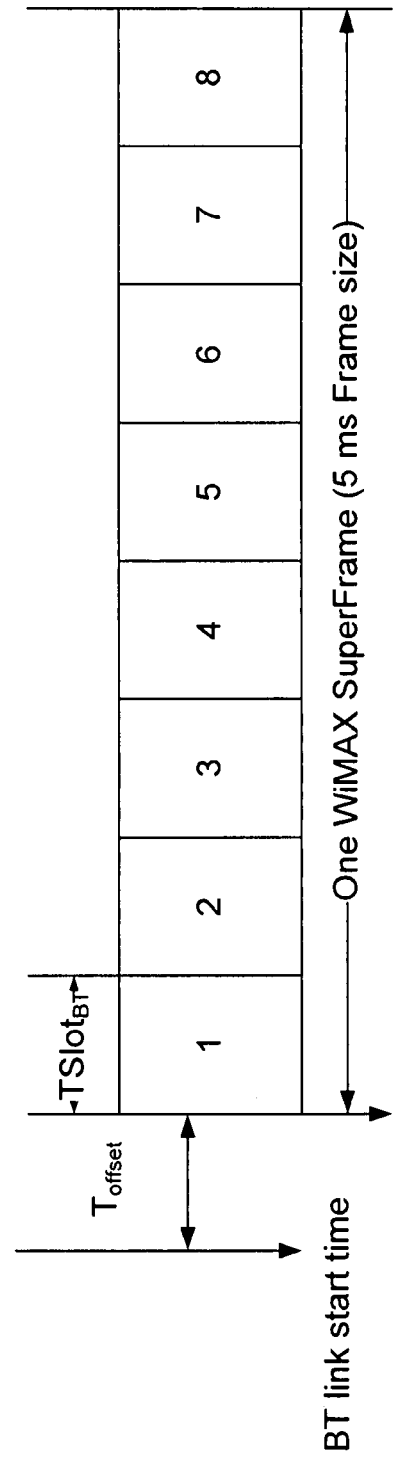
FIG. 3 illustrates an example WiMAX superframe divided into BT slots, according to one embodiment.

FIG. 3 illustrates an example WiMAX superframe associated with BT slots. The superframe has a duration of 5 ms (utilized for some WiMAX products) so it may be considered to have 8 BT slots (0.625 ms each). An offset ($T_{offset}$) may be provided between the start of BT communications (traffic) and WiMAX traffic (between BT master-to-slave link start time and the preamble start time of the WiMAX superframe). The $T_{offset}$ may be between 0 and 5 BT slots for an HV3 BT SCO link having six slots. The reception/downlink (DL) and transmission/uplink (UL) of data in the WiMAX frame may be noted as d and u respectively to indicate what BT slot they fall within. The d and u may be in the range of 1 to 8 BT slots since the WiMAX superframe is 8 BT slots. With reference to the BT master-to-slave slot start time, the MRP WiMAX DL slots can be calculated as $T_{offset}+d+8\,P_{WiMAX}n$ (equation 3) and the MRP WiMAX UL slots can be calculated as $T_{offset}+u+8\,P_{WiMAX}n$ (equation 4), where $P_{WiMAX}$ is the WiMAX traffic period defined as number of WiMAX frames, and n is an integer $\geq 0$.

The mutual interference between WiMAX and BT can be characterized as (1) WiMAX receiving (RX) temporal overlapping ratio which is the rate of temporal overlapping between BT transmissions (TX) and WiMAX RX operations, and (2) BT RX temporal overlapping ratio which is the ratio of temporal overlapping between WiMAX TX and BT RX operations. The less these overlapping ratios are the less the interference between WiMAX and BT will be.

In order to capture the MRP interference ratios, equations 1-4 can be utilized since they all define the transmission and receptions times with respect to BT slots. In order to characterize the temporal overlapping between WiMAX RX and BT TX equations 1 and 3 are set equal to each other such that $1+T_{sco}m=T_{offset}+d+8 P_{WiMAX}n$, for any m & n (equation 5).

If the BT radio transmits HV1 packets the $T_{sco}=2$, so that equation 5 becomes $1+2m=T_{offset}+d+8P_{WiMAX}n$. Solving provides that (1) there is no overlapping between BT TX and WiMAX RX when $T_{offset}+d(x)$ is an even value (e.g., x=2, 4, 6, or 8), and (2) WiMAX RX will collide with BT TX when x is an odd value (e.g., x=1, 3, 5, 7, or 9).

If the BT radio transmits HV2 packets the $T_{sco}=4$, so that equation 5 becomes $1+4m=T_{offset}d+8P_{WiMAX}n$. Solving provides (1) when x=2, 3, 4, 6, 7, 8, 10, or 11 there is no overlapping between BT TX and WiMAX RX, and (2) when x=1, 5, or 9, WiMAX RX will collide with BT TX.

If the BT radio transmits HV3 packets the $T_{sco}=6$, so that equation 5 becomes $1+6m=T_{offset}+d+8P_{WiMAX}n$. The determination of overlaps between BT TX and WiMAX RX depends on whether $P_{WiMAX}$ is a multiplier of 3 (e.g., 3 superframes, 6 superframes).

If $P_{WiMAX}$ is a multiplier of 3, then (1) for x=2, 3, 4, 5, 6, 8, 9, 10, 11, or 12 there is no overlapping between BT TX and MRP WiMAX RX, and (2) for x=1, 7, or 13 WiMAX RX will collide with BT TX.

If $P_{WiMAX}$ is not a multiplier of 3, the sequence of WiMAX RX frames are indexed 0, 1, 2, 0, 1, 2, . . . . For those WiMAX RX frames that are marked as 0, (1) when x=1, 7, 13, one out of three WiMAX RX frames will collide with BT TX, and (2) otherwise no overlapping occurs. For those WiMAX RX frames that are marked as 1, (1) when $x=6q-8P_{WiMAX}+1$, where q can be any non-negative integer, one out of three WiMAX RX frames will collide with BT TX, and (2) otherwise no overlapping occurs. For those WiMAX RX frames that are marked as 2, (1) when $x=6q-16P_{WiMAX}+1$, one out of those three WiMAX RX frames will collide with BT TX, and (2) otherwise no overlapping occurs.

The values of x can be utilized to determine an appropriate $T_{offset}$ (time between BT slot start time and WiMAX superframe start time) and safe zones within the WiMAX superframe for WiMAX RX for various different configurations.

FIG. 4 illustrates a table of example results for MRP WiMAX RX temporal overlapping ratio for various offset values and BT SCO links (HV1-3). The results are for receipt of example WiMAX header (preamble+FCH+MAP information) that is completed within the first BT slot time (0.625 ms) of each WiMAX frame (d=1) and that the WiMAX RX period is a single frame ($P_{WiMAX}=1$). For HV1-HV3, setting $T_{offset}$ to be an odd number results in an even value for x ($T_{offset}$, +d) which enables avoiding the MRP WiMAX header temporal overlapping with MRP BT transmissions (0% overlap ratio). In addition, selecting an even offset value of 2 (x=3) also results in 0% overlapping for HV2. For HV3, no offset or even values of offset (odd values of x) result in a 33.3% overlap rate.

It should be noted that the $T_{offset}$ is really limited to 0-1 for a BT HV1 SCO link and 0-3 for BT HV2 SCO link since the $T_{SCO}$ for HV1 is only 2 slots and the $T_{SCO}$ for HV2 is only 4 slots. That is, a $T_{offset}>1$ for HV1 is same as a $T_{offset}=0$ or 1 for future BT HV1 SCO links and a $T_{offset}>3$ for HV2 is same as $T_{offset}=0-3$ for future BT HV2 SCO links.

In order to characterize the temporal overlapping between BT RX and WiMAX TX, equations 2 and 4 are set equal to each other such that $2+T_{sco}m=T_{offset}+u+8 P_{WiMAX}n$, for any m & n (equation 6).

For HV1, $T_{sco}=2$ so equation 6 becomes $2+2m=T_{offset}+u+8P_{WiMAX}n$. Solving provides that (1) when $T_{offset}+u$ (y) is an odd value there is no overlapping between BT RX and WiMAX TX, and (2) when y is an even value one out of $4P_{WiMAX}$ BT RX will overlap with WiMAX TX. The WiMAX TX within a WiMAX traffic period may include voice data as well as contention code and bandwidth request transmissions For HV2, $T_{sco}=4$ so equation 6 becomes $2+4m=T_{offset}+u+8P_{WiMAX}n$. Solving provides (1) when y=1, 3-5, 7-9, or 11, there is no overlapping between BT RX and WiMAX TX, and (2) when y=2, 6 or 10, then one out of $2P_{WiMAX}$ BT RX will overlap with WiMAX TX.

For HV3, $T_{sco}=6$ so equation 6 becomes $2+6m=T_{offset}+u+8P_{WiMAX}n$. The determination of overlapping between BT RX and WiMAX TX depends on whether $P_{WiMAX}$ is a multiplier of 3.

If $P_{WiMAX}$ is a multiplier of 3, then (1) for y=1, 3-7, or 9-13 there is no overlapping between BT RX and WiMAX TX, and (2) for y=2 or 8, three out of $4P_{WiMAX}$ BT RX will overlap with WiMAX TX.

If $P_{WiMAX}$ is not a multiplier of 3 the sequence of WiMAX TX frames are indexed 0, 1, 2, 0, 1, 2, . . . . For those WiMAX TX frames that are marked as 0, (1) when y=2, or 8, one out of $4P_{WiMAX}$ BT RX will overlap with WiMAX TX in those frames, and (2) otherwise no overlapping occurs. For those WiMAX TX frames that are marked as 1, (1) when $y=6q-8P_{WiMAX}+2$, where q can be any non-negative integers, one out of $4P_{WiMAX}$ BT RX will overlap with WiMAX TX in those frames, and (2) otherwise no overlapping occurs. For those WiMAX TX frames that are marked as 2, (1) when $y=6q-16P_{WiMAX}+2$, one out of $4P_{WiMAX}$ BT RX will overlap with WiMAX TX in those frames, and (2) otherwise no overlapping occurs.

The values of y can be utilized to determine an appropriate $T_{offset}$ (time between BT slot time and WiMAX superframe start time) and safe zones within the WiMAX superframe for WiMAX TX for various different configurations.

FIG. 5 illustrates a table of example results for MRP BT receive temporal overlapping ratio for various DL:UL ratios and HV1-3. The $T_{offset}=1$ and the WiMAX traffic carries VoIP (e.g., 64 kbps) traffic with a period of 20 ms at both DL & UL directions ($P_{WiMAX}=4$) and is based on best effort service (e.g., contention code and bandwidth requests need to be sent before every UL opportunity (data transport) is allocated).

Utilizing a 7:1 DL:UL ratio (meaning the uplink (TX) occurs in the $8^{th}$ BT slot within the WiMAX superframe for data, contention code and bandwidth requests) results in y ($T_{offset}+d$) equal to 9 which enables avoiding MRP BT reception temporal overlapping with MRP WiMAX transmissions for HV1-3.

Utilizing a 6:2 DL:UL ratio (meaning the uplink (TX) occurs in the $7^{th}$ or $8^{th}$ BT slot for data the $7^{th}$ for contention code and BW requests). Accordingly, y=8 or 9 for data transmissions and 8 for contention/BW transmissions. For HV1, a y value of 8 results in an overlap rate of 6.25% ($\frac{1}{4}P_{WiMAX}$) for each TX (data, contention and BW) for a total 18.75% MRP BT reception temporal overlapping with MRP WiMAX transmissions. For HV2, neither y values of 8 or 9 result in any overlapping so the overlap rate is 0%. For HV3, the overlap rate ends up being 18.75%.

Utilizing a 5:3 DL:UL ratio (data TX may occur in 6-$8^{th}$ BT slots and contention/BW TX occurs in the $6^{th}$). Accordingly, y=7-9 for data TX and 7 for contention/BW TX. For HV1, y=8 results in an overlap rate of 6.25% ($¼P_{WiMAX}$). For HV2, none of y values result in any overlapping so the overlap rate is 0%. For HV3, the overlap rate ends up being 6.25%.

Utilizing a 4:4 DL:UL ratio (data TX may occur in 5-$8^{th}$ BT slots and contention/BW TX occurs in the $5^{th}$). Accordingly, y=6-9 for data TX and 6 for contention/BW TX. For HV1, y=6 results in an overlap rate of 6.25% ($¼P_{WiMAX}$) for data, contention and BW and y=8 results in an overlap rate of 6.25% for data. The overall data TX overlap rate is 12.5% and the overall overlap rate is 25%. For HV2, y=6 results in an overlap rate of 12.5% ($½P_{WiMAX}$) for data, contention and BW values for an overall overlap rate of 37.5%. For HV3, the overlap rate ends up being 25%.

Scheduling policies for minimizing the mutual interference between co-located BT and WiMAX can be generated based on the understanding of overlaps discussed above. For example, to avoid MRP WiMAX header RX temporal overlapping with co-located BT TX, the offset between the BT master-to-slave SCO slot start time and the WiMAX frame preamble start time should be an odd number (0) of BT slots ($T_{offset}=O*T_{BT-SLOT}$), where the $T_{offset}$ is limited by the $T_{SCO}$.

To avoid MRP WiMAX DL-burst temporal overlapping with co-located BT TX, the WiMAX base station can schedule DL-bursts in each WiMAX frame to be within in an even numbered (2k) BT slot (after an odd number (2k+1) of BT slot durations) after the BT SCO slot start time (e.g., x=even number), where k is an integer $\geq 0$ subject to the length of the DL subframe. Assuming that the $T_{offset}$ was an odd number of BT slots, the DL bursts would be scheduled in an odd numbered BT slot (after an even number of slot durations) within the WiMAX frame. In other words, the WiMAX DL-burst should fall in the 2k+1 BT slot (between $2k*T_{BT-SLOT}$ and $(2k+1)*T_{BT-SLOT}$ durations after the preamble start time) of each WiMAX frame in order to avoid colliding with co-located BT TX. Equating this to WiMAX slots, the WiMAX DL-burst should fall between ceiling $(2k*T_{BT-SLOT}/T_{WiMAX-SLOT})$ and floor$((2k+1)*T_{BT-SLOT}/T_{WiMAX-SLOT})$ WiMAX slot, where $T_{WiMAX-SLOT}$ is the duration of a WiMAX slot.

To avoid MRP BT reception temporal overlapping with co-located WiMAX transmissions the WiMAX base station may set the DL:UL ratio as either 7:1 or 5:3. These DL:UL ratios may be practical in real systems since DL and UL traffic volumes are often asymmetrical. Additionally, time division duplex (TDD) network makes it possible to dynamically adjust the DL:UL ratio.

The three policies are independent and their impacts are additive. Either all of them or just a subset of them can be applied at a time, depending on the flexibility of the real system. When all of them are applied, the maximum performance gain can be obtained.

Figure 6:
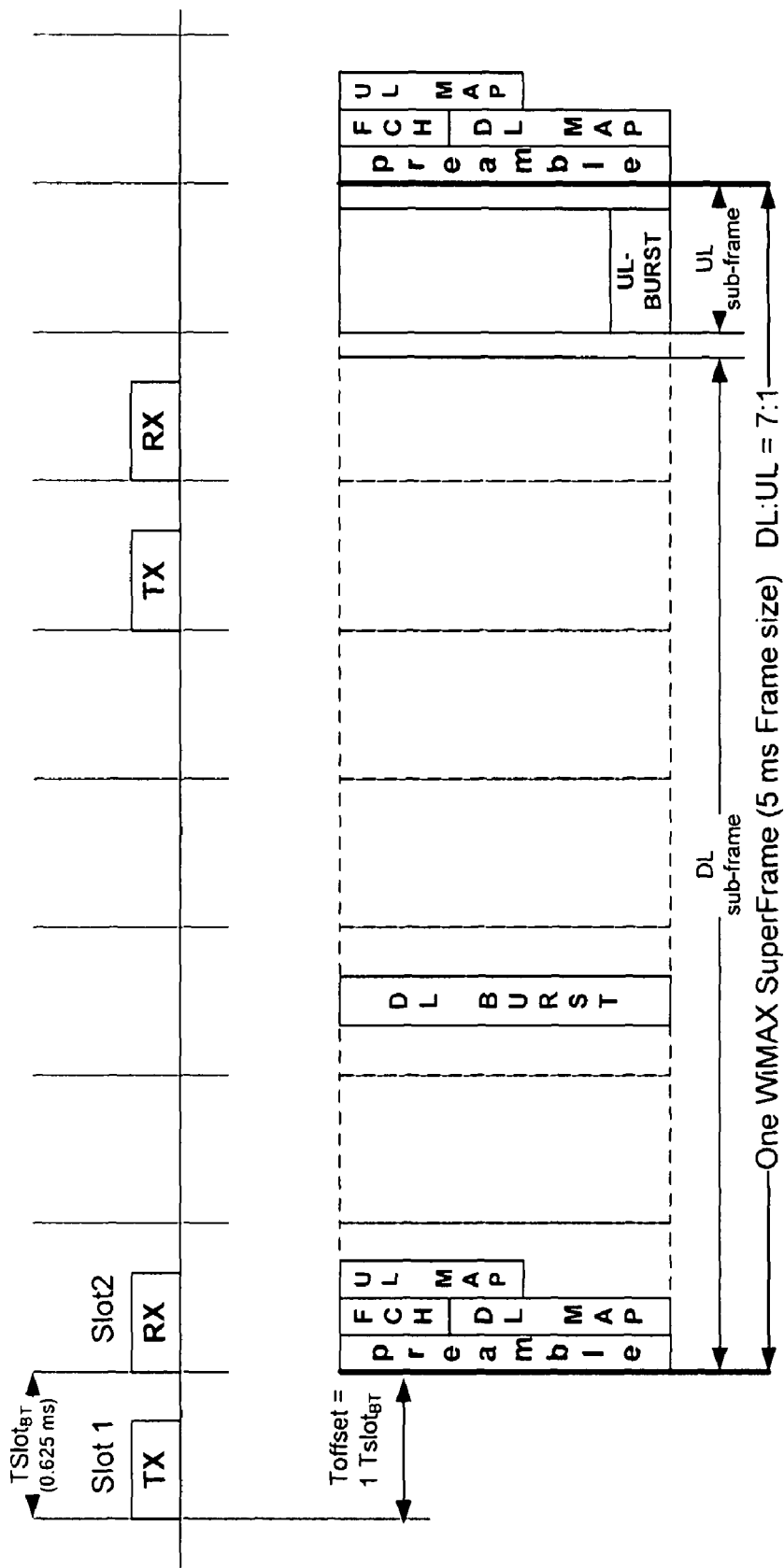
FIG. 6 illustrates an example implementation of the scheduling scheme to avoid TX/RX overlaps for MRP BT and WiMAX communications, according to one embodiment.

FIG. 6 illustrates an example implementation of the scheduling scheme to avoid TX/RX overlaps for MRP BT (HV3) and WiMAX communications. The $T_{offset}=1$ (odd number), and the WiMAX RX occurs within the $3^{rd}$ (2k+1) BT slot of the WiMAX frame (4th BT slot after BT SCO slot start time). The DL:UL=7:1 so that the WiMAX TX occurs in the $8^{th}$ BT slot of the WiMAX frame. The absence of overlaps between BT TX/RX and WiMAX RX/TX are only illustrated for a single WiMAX frame for ease of illustration. However, it is understood that overlaps would continue to be avoided for addition WiMAX frames if this scheduling scheme is utilized.

A scheduler may be utilized to determine how to avoid or minimize conflicts (BT TX/WiMAX RX and BT RX/WiMAX TX) for the particulars of the configuration of the MRP. The scheduler may calculate the safe zones (slots with no conflicts or minimal conflicts) by, for example, solving equations similar to those advanced above for the particular configuration of the MRP. The scheduler may contain a lookup table with safe zones identified for various configurations and do a lookup for the particular configuration. The scheduler may set the TX/RX parameters of the WiMAX communications or a user or system operator may set the parameters.

Initially, a $T_{offset}$ may be determined that best suites the WiMAX and BT traffic for the MRP and the clocks for each radio may be synchronized so as to maintain the $T_{offset}$. After the $T_{offset}$ is determined the safe WiMAX RX slots and the safe WiMAX TX slots can be determined for the particular configuration taking into account the $T_{offset}$ and the WiMAX TX and RX slots may be selected. The MRP may communicate the WiMAX TX and RX parameters with the WiMAX base station.

The scheduling techniques discussed above have made specific reference to BT and WiMAX but are in no way limited thereto. Rather, the scheduling techniques could be applicable to any two radios with centralized control for channel accesses. For example, it could be applied between any two different wireless networks (e.g., WMAN, WLAN, WPAN).

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in a least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A method comprising
selecting an offset between start of communications of a first radio in a multi-radio platform (MRP) and start of communications of a second radio in the MRP;
synchronizing clocks of the first radio and the second radio to maintain the offset; and
determining safe zones within the communications of the second radio based on configuration of the first radio and the second radio and the selected offset, wherein the safe zones are locations that minimize conflicts between receiving operations of the first radio that are at fixed locations and transmitting operations of the second radio and transmitting operations of the first radio that are at fixed locations and receiving operations of the second radio.

2. The method of claim 1, further comprising selecting transmitting locations and receiving locations for the second radio that fall within the determined safe zones.

3. The method of claim 1, wherein the determining safe zones includes looking up the safe zones based on the configuration of the first radio and the second radio and the selected offset.

4. The method of claim 1, wherein the determining safe zones includes calculating the safe zones based on configuration of the first radio and the second radio and the selected offset.

5. The method of claim 1, wherein the first radio is a Bluetooth (BT) radio and the second radio is a WiMAX radio.

6. The method of claim 5, wherein the selecting an offset includes selecting the offset between a BT link start time and a WiMAX superframe start time.

7. The method of claim 6, wherein the determining safe zones includes determining transmitting locations within the WiMAX superframes that will minimize conflicts with receiving slots within the BT links and receiving locations within the WiMAX superframes that will minimize conflicts with transmitting slots within the BT links.

8. The method of claim 7, further comprising selecting an downlink to uplink ratio for the WiMAX superframe.

9. An apparatus comprising
a Bluetooth (BT) radio to communicate over a first wireless network, wherein traffic from the BT radio includes defined transmit and receive locations;
a WiMAX radio to communicate with a second wireless network, wherein transmit and receive locations can be defined in a header for traffic from the WiMAX radio;
a scheduler to select an offset between start of traffic from the BT radio and start of traffic from the WiMAX radio and to determine the transmit and receive locations for the WiMAX radio based on the selected offset and configurations of the BT radio and the WiMAX radio, wherein the transmit location is selected to minimize conflicts with the defined receive locations of the BT radio and the receive location is selected to minimize conflicts with the defined transmit locations of the BT radio.

10. The apparatus of claim 9, wherein the scheduler is to select the offset between a BT link start time and a WiMAX superframe start time.

11. The apparatus of claim 10, wherein the scheduler is to determine the location of uplink and downlink bursts within the WiMAX superframe.

12. The apparatus of claim 10, wherein the scheduler is to determine a downlink to uplink ratio for the WiMAX superframe.

* * * * *